United States Patent
Holt

(10) Patent No.: US 8,424,458 B2
(45) Date of Patent: Apr. 23, 2013

(54) ROTATING STRUCTURES

(76) Inventor: Eric Holt, Costa Mesa, CA (US)

(*) Notice: Subject to any disclaimer, the term of this patent is extended or adjusted under 35 U.S.C. 154(b) by 0 days.

(21) Appl. No.: 13/108,946

(22) Filed: May 16, 2011

(65) Prior Publication Data
US 2011/0215219 A1 Sep. 8, 2011

Related U.S. Application Data

(62) Division of application No. 11/893,635, filed on Aug. 17, 2007, now Pat. No. 7,966,939.

(51) Int. Cl.
*B60S 13/02* (2006.01)

(52) U.S. Cl.
USPC .................. 104/44; 104/36; 104/46

(58) Field of Classification Search ........ 104/35, 104/36, 41, 43, 44, 46
See application file for complete search history.

(56) References Cited

U.S. PATENT DOCUMENTS

| | | | | | |
|---|---|---|---|---|---|
| 2,044,031 | A | * | 6/1936 | Nieuwland | 104/44 |
| 2,395,528 | A | * | 2/1946 | Andersen | 254/93 R |
| 3,822,652 | A | * | 7/1974 | Burdick et al. | 108/139 |
| 6,672,221 | B2 | * | 1/2004 | Hadley | 104/35 |
| 7,631,602 | B2 | * | 12/2009 | Schwenker | 104/44 |
| 7,966,939 | B2 | * | 6/2011 | Holt | 104/35 |
| 2009/0045312 | A1 | * | 2/2009 | Holt et al. | 248/349.1 |

* cited by examiner

*Primary Examiner* — S. Joseph Morano
*Assistant Examiner* — Zachary Kuhfuss

(57) ABSTRACT

An embodiment of the present invention is a rotating structure. An outer ring is placed on a first surface of a trench in a foundation having a ground surface. An inner ring is positioned inside the outer ring on the first surface. A bar assembly is positioned between the outer ring and the inner ring. A plurality of rollers supports the bar assembly. A plurality of motors engages to the bar assembly to cause the bar assembly to rotate when activated.

1 Claim, 13 Drawing Sheets

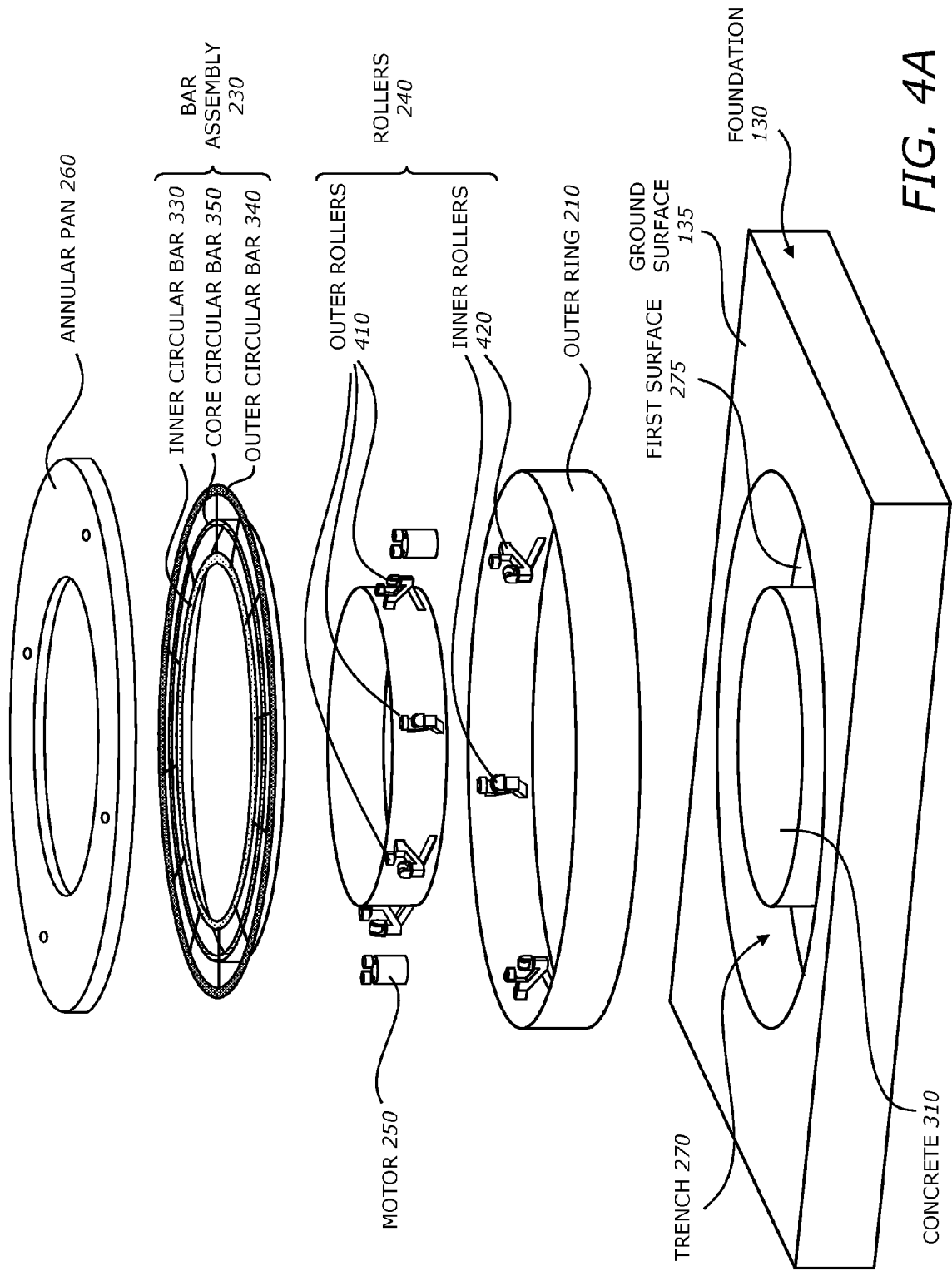

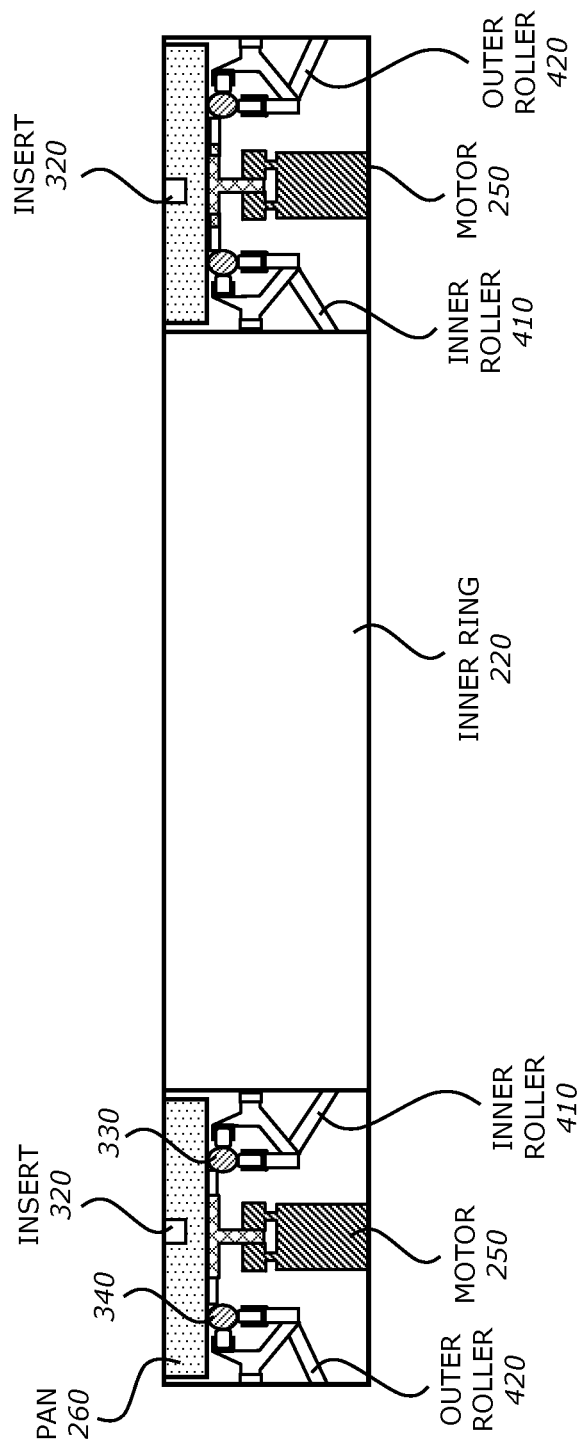

ROTATING STRUCTURES

CROSS-REFERENCES TO RELATED APPLICATIONS

This is a Divisional Application of U.S. patent application Ser. No. 11/893,635, filed on Aug. 17, 2007, now U.S. Pat. No. 7,966,939. This Divisional Application claims the benefit of the U.S. patent application Ser. No. 11/893,635.

BACKGROUND

1. Field of the Invention

Embodiments of the invention relate to the field of mechanical systems, and more specifically, to rotating structures.

2. Description of Related Art

Rotation structures provide a means to rotate objects around to serve several purposes, such as displaying automobiles in showroom, turntables for aircraft in storage hangar, rotating floors in theaters, nightclubs, and residential homes, etc. One type of rotation structures is turntable for vehicles. Turntables for vehicles provide for rotation of the vehicles to allow effective entry and exit in confined spaces such as driveways.

Existing techniques to construct rotating structures for vehicles have a number of drawbacks. One technique uses a motor to drive a shaft attached to a platform. This technique does not have mechanical stability, difficult to construct, and expensive. Another technique uses a number of wheels located on the periphery of a track table. This technique requires many moving parts and may suffer frequent breakdowns.

BRIEF DESCRIPTION OF THE DRAWINGS

Embodiments of invention may best be understood by referring to the following description and accompanying drawings that are used to illustrate embodiments of the invention. In the drawings:

FIG. 4A is a diagram illustrating an exploded view of a rotating structure having lateral rollers support according to one embodiment of the invention.

FIG. 4B is a diagram illustrating a cross-sectional view of the rotating structure having lateral rollers support according to one embodiment of the invention.

DESCRIPTION

Figure 1A:
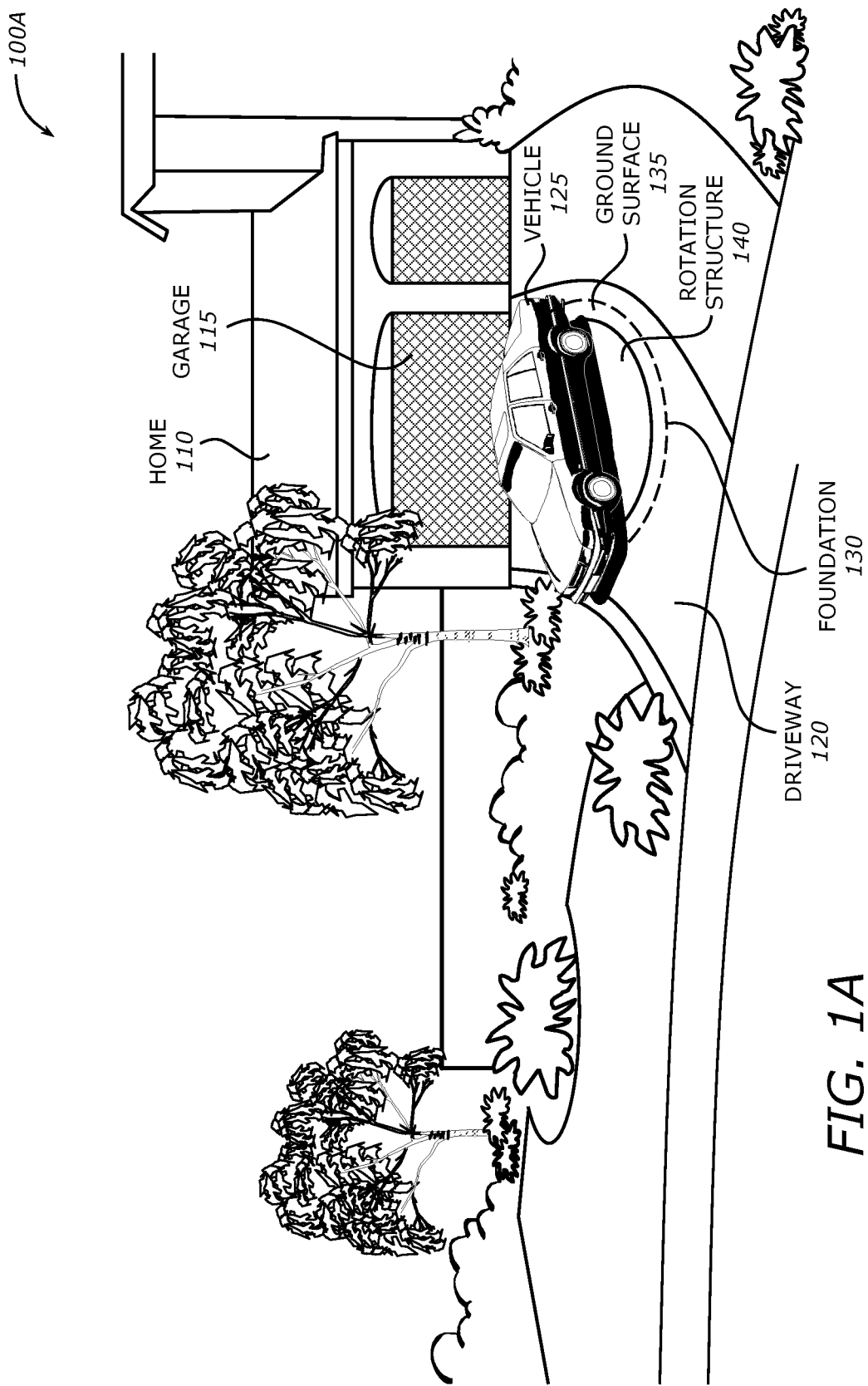
FIG. 1A is a diagram illustrating a residential system according to one embodiment of the invention.

An embodiment of the present invention is a rotating structure. An outer ring is placed on a first surface of a trench in a foundation having a ground surface. An inner ring is positioned inside the outer ring on the first surface. A bar assembly is positioned between the outer ring and the inner ring. A plurality of rollers supports the bar assembly. A plurality of motors engages to the bar assembly to cause the bar assembly to rotate when activated.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

An embodiment of the present invention is a technique to construct and install a rotating structure. The rotating structure may be used in a number of applications including vehicle turntables in residential home or public ways, products display, vehicle storage, food or drinks serving establishments, nightclubs, theaters, or any other applications that may involve rotating an object. The rotating structure is easy to construct, install, and maintain. It is also cost-effective, convenient, flexible, durable, and reliable. It may be installed below the ground surface or on the ground surface depending on the applications. The description that follows may focus on structures below a ground surface. It is, however, contemplated that the rotating structure may be installed on a ground surface. Furthermore, although the description may refer to a vehicle, it is understood that embodiments of the invention may be used for anything, including people and animals, that may need to be rotated or turned.

For applications that are below the ground surface, a foundation is selected where the rotating structure is to be installed. The foundation is excavated to remove the soil or material below. A trench or a ditch having a circular shape is formed.

The rotating structure includes two rings having approximately equal heights: an outer ring and an inner ring. Both rings are placed inside the trench on the bottom surface of the trench. The depth of the trench matches with the height of the outer and inner rings with some clearance to allow for variations. The inner ring is positioned inside the outer ring, preferably in a concentric manner. The inside of the inner ring may be filled up with concrete or any other suitable material to ensure rigidity. A bar assembly is positioned between the outer ring and the inner ring. The bar assembly includes at least one core circular bar that may be engaged to a number of motors. When the motors are activated, the bar assembly rotate. A number of rollers is provided to support the bar assembly and to facilitate the rotation. A pan or a platform is attached or secured to the bar assembly. The dimensions and shape of the pan match with the bar assembly. Typically, it is annular where the outer diameter matches with the diameter of the outer ring and the inner diameter matches with the diameter of the inner ring. The pan is flush with the ground surface. The vehicle or the object to be rotated is placed or parked on the pan. As the bar assembly rotates, the pan is rotated carrying the vehicle or the object.

FIG. 1A is a diagram illustrating a residential system 100A according to one embodiment of the invention. The system 100A includes a home 110, a driveway 120, a vehicle 125, a foundation 130, and a rotating structure 140. Note that the system 100A may include more or less than the above components.

The home 110 is a residential unit. It typically includes a garage 115. The driveway 120 leads from the street to the front door of the garage 115. The vehicle 125 may be any vehicle or object that may need to be rotated for any purposes. It may be an automobile, a van, a motorbike, etc.

The foundation 130 is an area on the driveway 120 that houses or contains the rotating structure 140. It has a ground surface 135 that is essentially level on the driveway 120. The rotating structure, which may be referred to as a turntable, 140 has a rotating platform, or a pan, that is level with the ground surface 135. There may be markers (e.g., specially colored spots, lights) on the platform to serve as a guide for the user to park the vehicle 125 properly on the rotating structure 140. The rotating platform has a size or dimension that is compatible with the vehicle 125.

A user drives the vehicle 125 from the street to the driveway 120 and parks on the rotating structure 140. The user may use a remote control device to activate the rotating structure 140 to rotate to any desired angle when he or she wants to drive off the vehicle 125 in any direction. The vehicle 125 may be rotated as the rotating platform rotates. Through remote control or any other appropriate control mechanisms, the user may activate or deactivate the rotating structure 140, or to control the speed of rotation. The user may or may not be in the vehicle 125 to control the rotating structure 140.

Figure 1B:
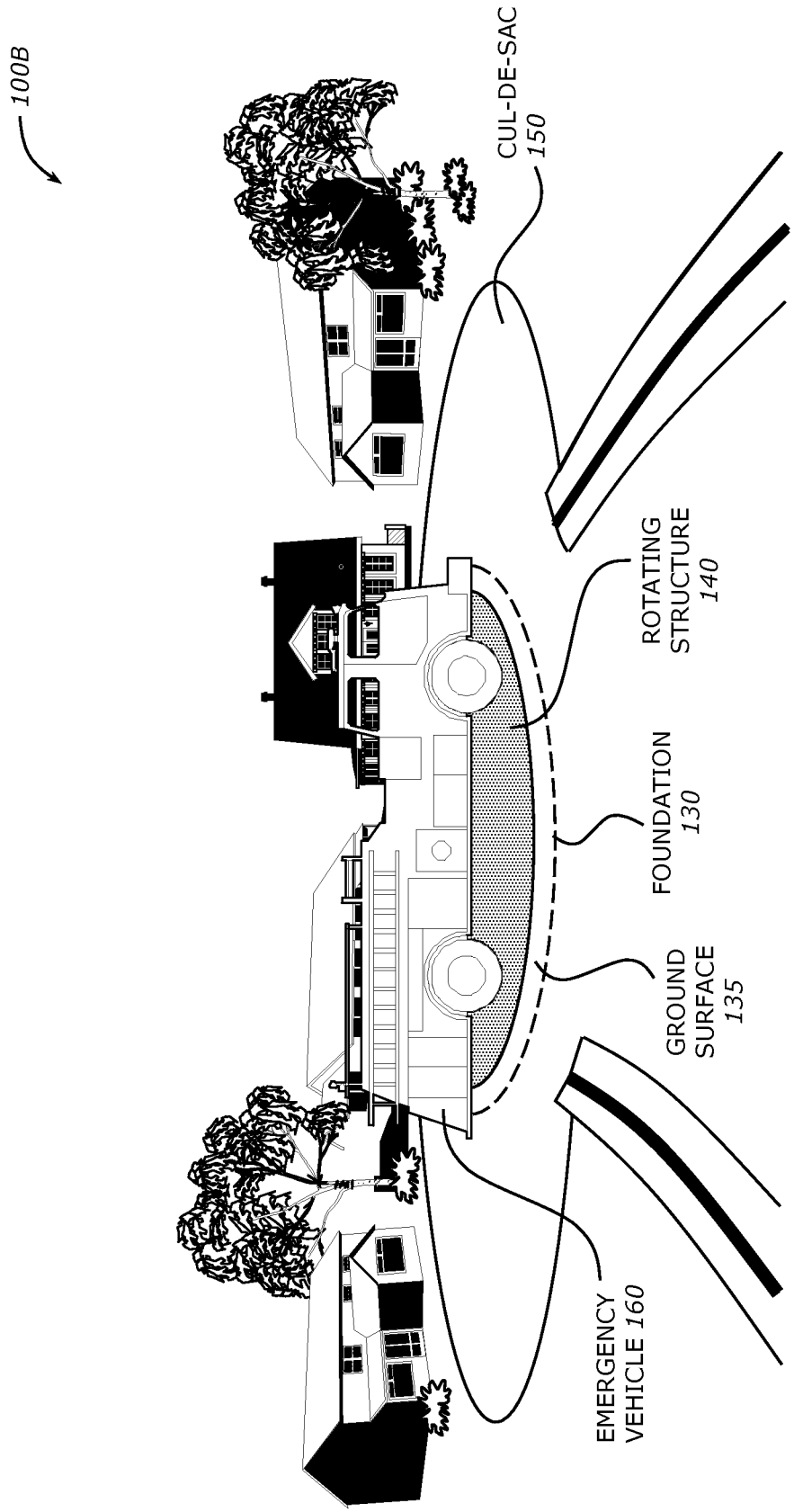
FIG. 1B is a diagram illustrating an emergency service system according to one embodiment of the invention.

FIG. 1B is a diagram illustrating an emergency service system 100B according to one embodiment of the invention. The emergency service system includes a cul-de-sac 150, an emergency vehicle 160, the foundation 130, and the rotating structure 140. Note that the system 100B may include more or less than the above components.

The cul-de-sac 150 represents an end of a street. It may be any other area that may have confined space or may be difficult for vehicles to maneuver or turn around. The emergency vehicle 160 may be any vehicle that is operated by a public, government agency, or private organization such as law enforcement agency, fire department, hospital, paramedics, etc that offers emergency services.

The foundation 130 and the rotating structure 140 are similar to those shown in FIG. 1A. The foundation 130 may be an area that houses or contains the rotating structure 140. It may be located at the center of the cul-de-sac 150 or any other suitable location. It may have the ground surface 135 that is level with the surface of the street to the cul-de-sac 150. The rotating structure 140 has a rotating platform that has size or dimension compatible with the emergency vehicle 160. It may also be strong enough to support the weight of the emergency vehicle 160.

The emergency vehicle 160 may be rotated or turned to any desired angle for entry and exit to and from the cul-de-sac 150. During emergency, it may be critical for the emergency personnel to maneuver the emergency vehicle 160 in an efficient manner. The rotating structure 140 allows the emergency vehicle 160 to be turned or rotated safely and efficiently.

Figure 2:
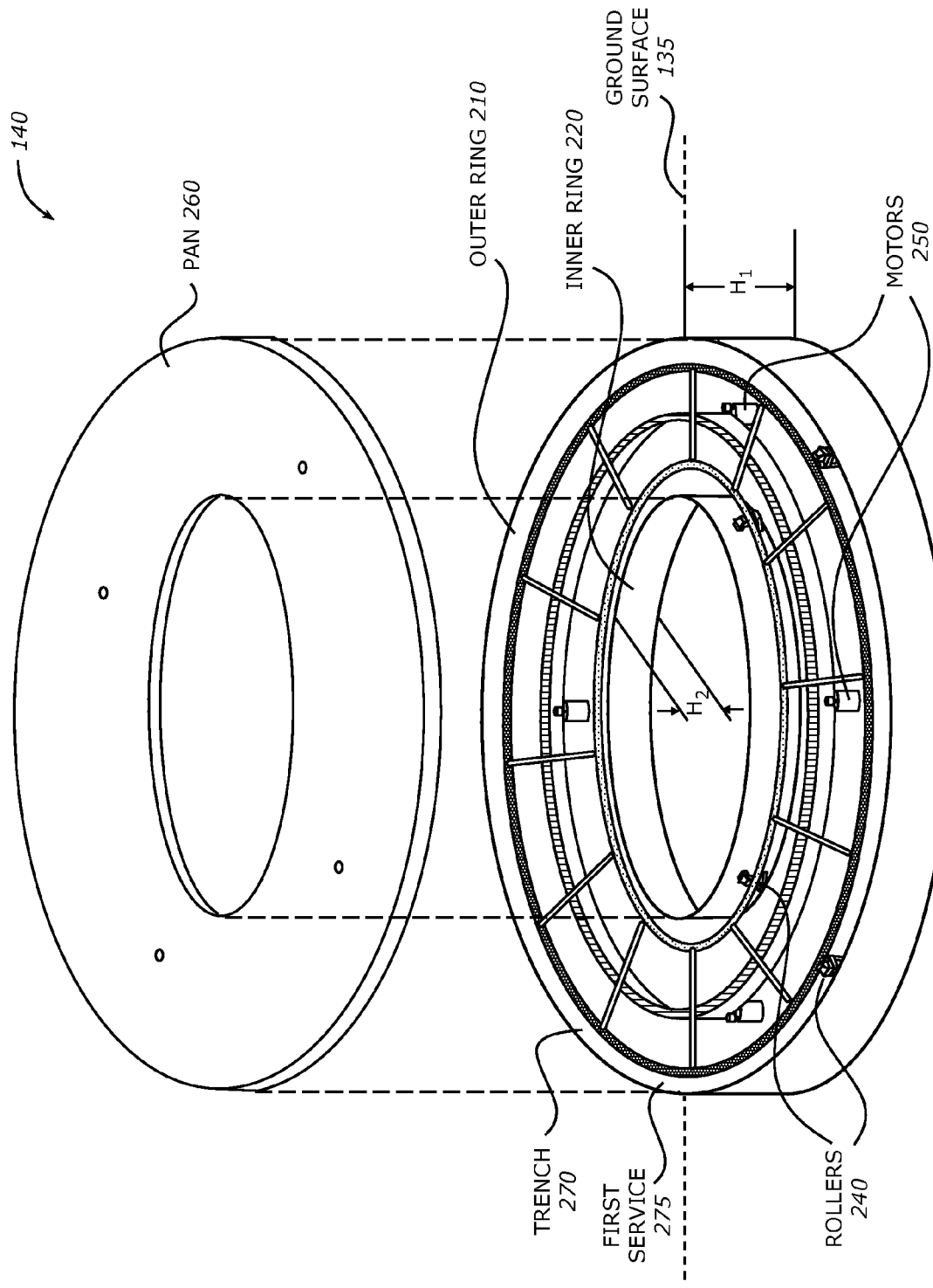
FIG. 2 is a diagram illustrating a rotating structure according to one embodiment of the invention.

FIG. 2 is a diagram illustrating the rotating structure 140 shown in FIGS. 1A and 1B according to one embodiment of the invention. The rotating structure 140 includes an outer ring 210, an inner ring 220, a bar assembly 230, a plurality of rollers 240, a plurality of motors 250, and a pan, or a platform, 260. The rotating structure 140 may include more or less than the above elements. The rotating structure 140 is installed in the foundation 130.

The outer ring 210 is placed in a trench 270 of the foundation 130. The trench 270 may be a hollow area with a circular shape. It has a first surface 275 at the bottom. The outer ring 210 may be a sheet made of metal (e.g., steel) and form a circle. It is placed on the first surface 275 in the circular trench 270 to define the external boundary of the rotating structure 140. It may keep or retain the ground soil or concrete from getting inside. The outer ring may have a first height $H_1$. The height $H_1$ may range from approximately one foot to 3 feet. The diameter of the outer ring 210 may be selected to accommodate the size of the vehicle or the object to be rotated. In one embodiment, the diameter of the outer ring may range from 10 feet to 15 feet.

The inner ring 220 is placed or positioned inside the outer ring 210 on the first surface 275. It may be filled with concrete or any other material that provides strength and stiffness. It may be a sheet made of metal (e.g., steel) and form a circle. Typically the inner ring 220 and the outer ring 210 are concentrically positioned inside the trench 270. The inner ring 220 may have a height $H_2$ that is compatible with $H_1$. In one embodiment, $H_1$ and $H_2$ are approximately the same to provide evenness for the pan 260 when it is placed on the bar assembly 230. Furthermore, the heights $H_1$ and $H_2$ are approximately equal to the depth of the trench 270 so that the pan 260 may be flush with the ground surface. The diameter of the inner ring 220 may be selected to accommodate the size of the vehicle. In one embodiment, the diameter of the outer ring may range from 5 feet to 9 feet.

The bar assembly 230 may be positioned between the outer ring 210 and the inner ring 220 horizontally. The bar assembly 230 provides the rotational movement that is used to rotate the vehicle. In one embodiment, the bar assembly 230 includes one core circular bar and two inner and outer circular bars. In another embodiment, the bar assembly 230 includes only one core circular bar. The bar assembly 230 may be placed at a height that is slightly below the height H1 and H2 so that the pan 260 may be fit on top of it to provide surface evenness with the ground surface 135.

The plurality of rollers 240 supports the bar assembly 230 and facilitates the rotational movement. They may be located or positioned according to the various embodiments. In the embodiment shown in FIG. 2, they are placed on the outer surface of the inner ring 220 and the inner surface of the outer ring 210 to provide lateral support for the bar assembly 230. Each of the rollers 240 may include an attachment mechanism to attach to the surface of the rings and a wheel that touches the bar assembly 230 to allow the bar assembly 230 to rotate when activated.

The plurality of motors 250 engages the bar assembly 230 to cause the bar assembly 230 to rotate when activated. The motors 250 are positioned on and attached to the first surface 275 and are coupled to the bar assembly 230. When they are activated or energized, they provide rotational action on the bar assembly 230. In one embodiment, the motors 250 are hydraulic motors. The motors 250 may be controlled by a control mechanism that may have remote control capability so that the user may activate the rotational movement remotely.

The pan 260 is placed on the bar assembly 230 and fit between the outer and inner rings 210 and 220 to provide support for the vehicle such that the vehicle is rotated with the bar assembly 230. The pan 260 may be attached or secured firmly to the bar assembly 230 through an attachment mechanism. The pan 260 may have an annular shape to fit the space between the outer ring 210 and the inner ring 220. It may have a thickness that fits the difference between the height of the bar assembly 230 and the heights of the outer and inner rings 210 and 220. When it is placed on the bar assembly 230, the pan 260 is flush with the ground surface 135.

Figure 5A:
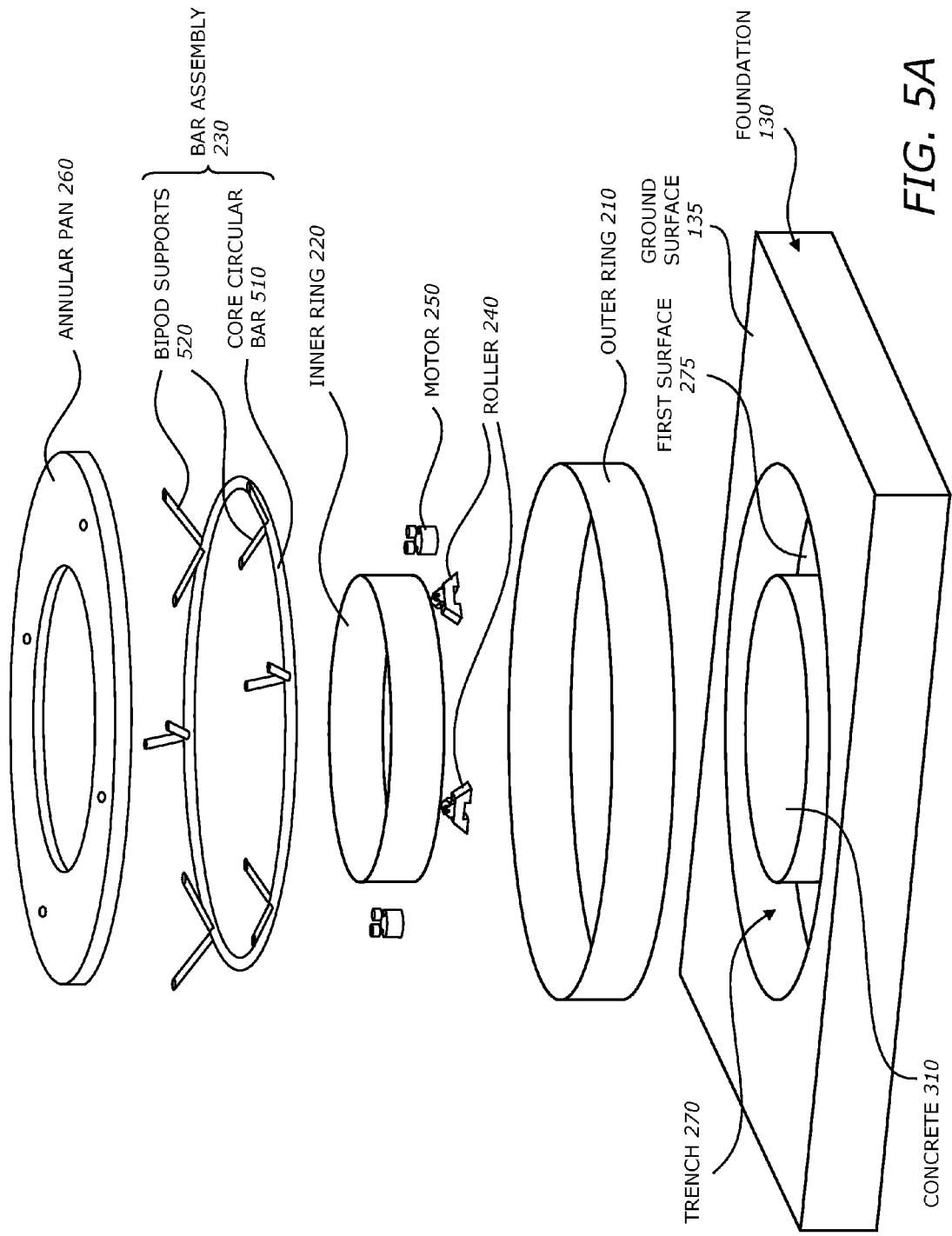
FIG. 5A is a diagram illustrating an exploded view of a rotating structure having bar assembly with bipod supports according to one embodiment of the invention.
Figure 5B:
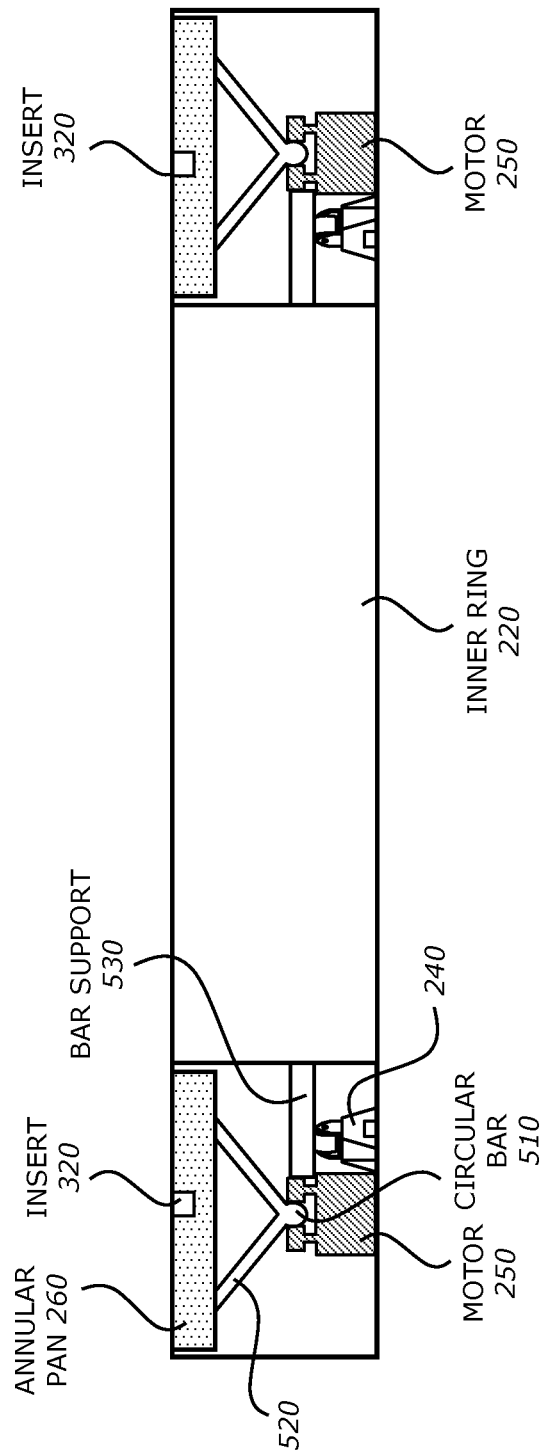
FIG. 5B is a diagram illustrating a cross-sectional view of the rotating structure having bar assembly with bipod supports according to one embodiment of the invention.

There are at least three embodiments of the invention. The first two embodiments are shown in FIGS. 3A, 3B, 4A and 4C. These two embodiments have similar bar assembly 230. They mainly differ in the placement of the rollers 240. The third embodiment is shown in FIGS. 5A and 5B. It has a different bar assembly 230 and different placement of the rollers 240. The description of these embodiments focuses mainly on the bar assembly 230 and the rollers 240. The other components including the outer ring 210, the inner ring 220, the motors 250, and the pan 260 are essentially the same and therefore will not be described further for brevity.

Figure 3A:
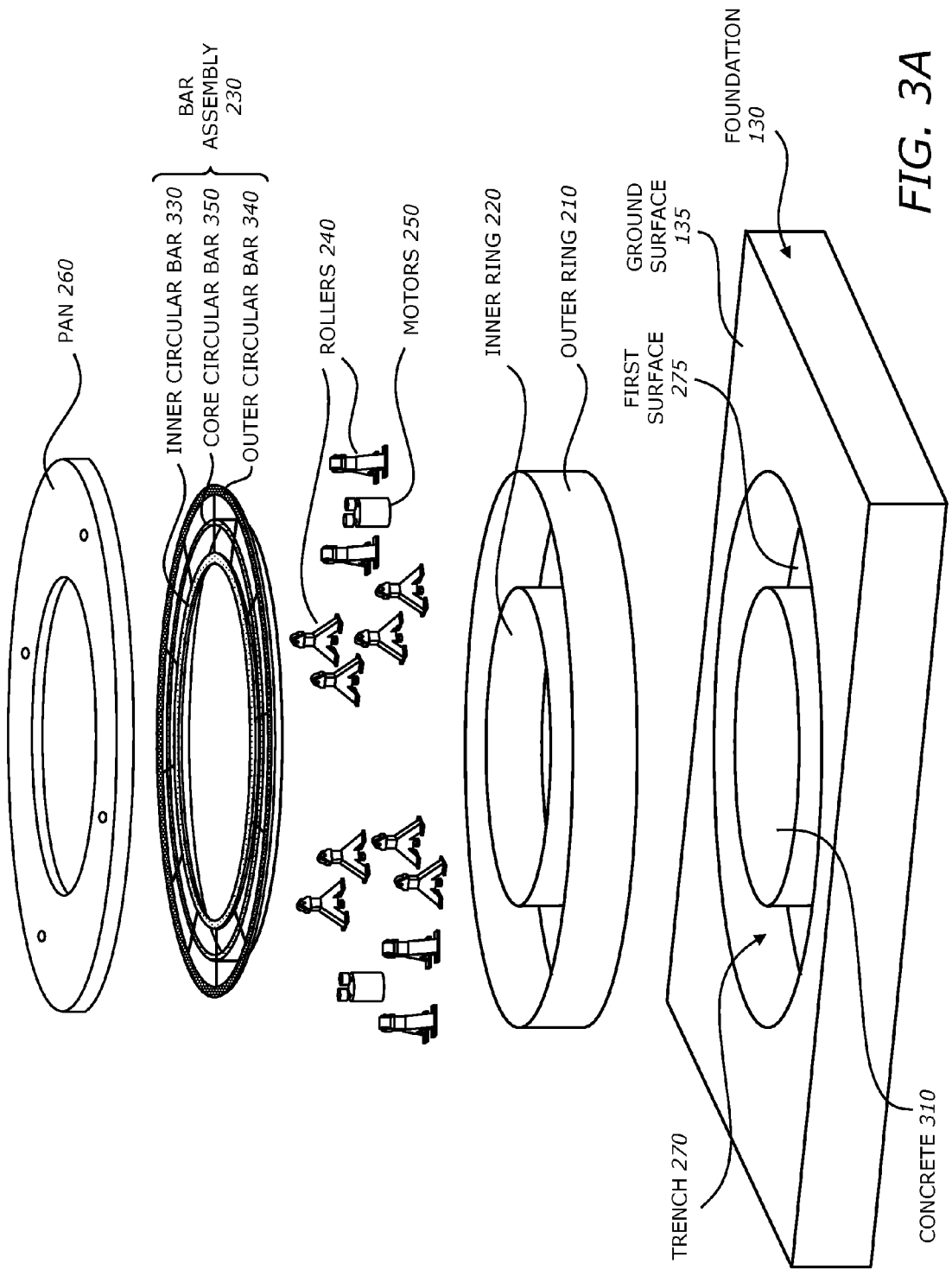
FIG. 3A is a diagram illustrating an exploded view of a rotating structure having rollers support on the ground surface according to one embodiment of the invention

FIG. 3A is a diagram illustrating an exploded view of the rotating structure having rollers support on the ground surface according to one embodiment of the invention.

The bar assembly 230 includes an inner circular bar 330, an outer circular bar 340 and a core circular bar 350. The three circular bars form concentric circles where the core circular bar 350 is positioned between the inner and outer circular bars 330 and 340. The core circular bar 350 may be attached to the inner and outer circular bars 330 and 340 so that when it is rotated, the entire bar assembly 230 including all three circular bars is also rotated. The inner and the outer circular bars 330 and 340 provide mechanical support for the pan 260. They also have movement contact with the wheels on the rollers when they are rotated. The core circular bar 350 may have a rectangular cross-section to fit to the motors 250. It is coupled and engaged to the motors 250 such that when the motors are activated the core circular bar 350 is rotated together with the inner and outer circular bars 330 and 340.

The inner, outer, and core circular bars 330, 340, and 350 may be made of an appropriate material (e.g., steel) that provides sufficient strength to carry the weight of the vehicle. The inner and outer cicular bars 330 and 340 may have a tubular shape to accommodate the wheels on the rollers 240. They may have a diameter ranging from one inch to three inches. The core circular bar 350 may have a height slightly larger than the diameter of the inner and outer circular bars 330 and 340. The three circular bars 330, 340, and 350 may be attached together by attachment bars 355.

The rollers 240 are attached or secured to the first surface 275 and coupled or engaged to the bar assembly 230. They may be positioned at approximately equal distances around the circular bars 330, 340, and 350. In one embodiment, the number of the rollers 240 may range from six to twenty four.

Figure 3B:
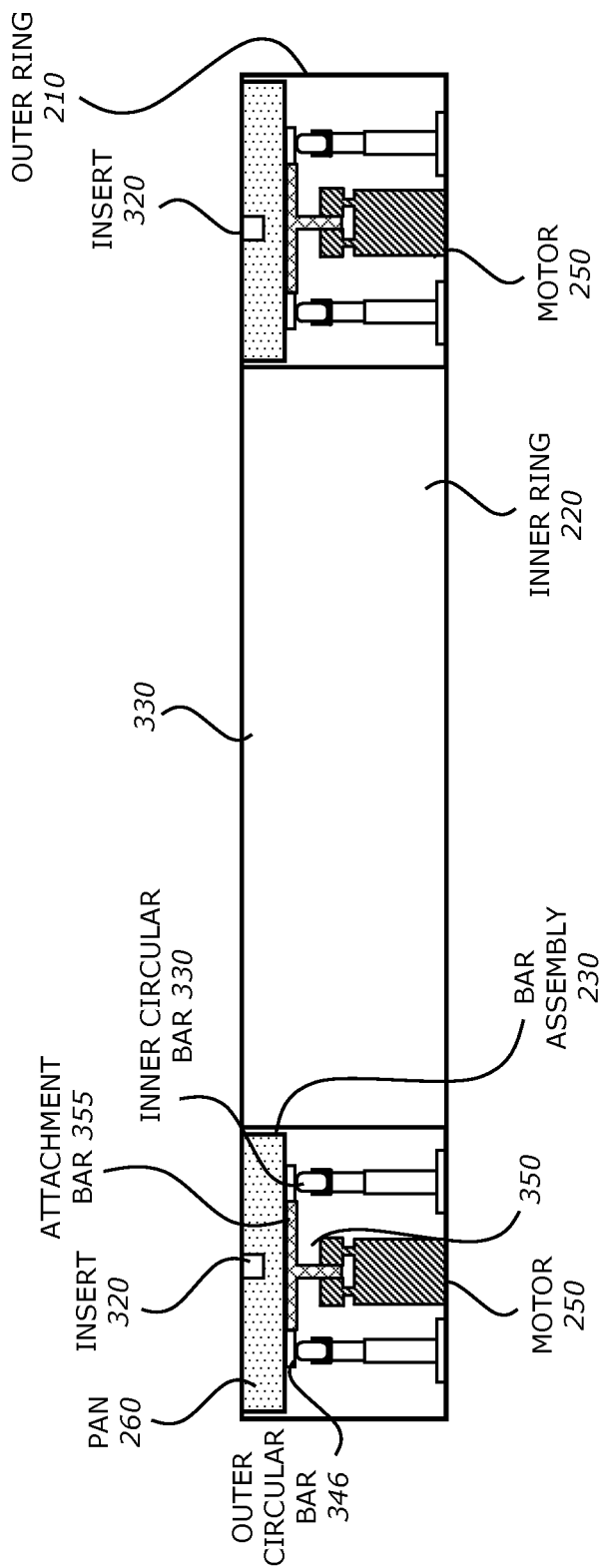
FIG. 3B is a diagram illustrating a cross-sectional view of the rotating structure having rollers support on the trench surface according to one embodiment of the invention.

FIG. 3B is a diagram illustrating a cross-sectional view of the rotating structure having rollers support on the trench surface according to one embodiment of the invention.

The pan 260 is placed on top of the bar assembly 230. It may have inserts 320 that serve as pick-up points for concrete for maintenance purposes. The rollers 240 support the corresponding circular bars 330, 340, and 350 from the first surface 275 of the trench 270. The motors 250 are engaged to the core circular bar 350 from the first surface 275.

FIG. 4A is a diagram illustrating an exploded view of a rotating structure having lateral rollers support according to one embodiment of the invention.

The bar assembly 230 is similar to the bar assembly 230 shown in FIG. 3A. The main difference is that the rollers 240 are attached or engaged to the bar assembly 230 laterally instead of from the first surface 275. The rollers 240 include inner rollers 410 and outer rollers 420. The inner rollers 410 are attached to the outer surface of the inner ring 220 at approximately equal distances around the surface of the inner ring 220. They are coupled or engaged to the inner circular bar 330. The outer rollers 420 are attached to the inner surface of the outer ring 210 at approximately equal distances around the surface of the outer ring 210. They are coupled or engaged to the outer circular bar 340. In one embodiment, the numbers of the inner rollers 410 and the outer rollers 420 are the same. There may be between two to twelve inner rollers 410 or outer rollers 420.

FIG. 4B is a diagram illustrating a cross-sectional view of the rotating structure having lateral rollers support according to one embodiment of the invention.

The pan 260 is placed on top of the bar assembly 230 in a similar manner as shown in FIG. 3B. The inner rollers 410 are attached to the outer surface of the inner ring 220 to engage to the inner circular bar 330 of the bar assembly 230. The outer rollers 420 are attached to the inner surface of the outer ring 210 to engage to the outer circular bar 340 of the bar assembly 230. The motors 250 are engaged to the core circular bar 350 from the first surface 275 of the trench 270.

FIG. 5A is a diagram illustrating an exploded view of a rotating structure having bar assembly with bipod supports according to one embodiment of the invention.

The bar assembly 230 includes a core circular bar 510 having a plurality of bipod supports 520 positioned at approximately equal distances thereon. In one embodiment, the number of bipod supports 520 may range from four to twelve. Each of the bipod supports has a V-shape structure pointing upward to support the pan 260 when it is secured to the bar assembly 230. The core circular bar 510 is engaged to the motors 250 in the same manner as shown in the previous two embodiments.

The rollers 240 support the bar assembly 230 via a number of bar supports 530. The bar supports 530 may be bars attached horizontally to the outer surface of the inner ring 220 or the inner surface of the outer ring 210.

FIG. 5B is a diagram illustrating a cross-sectional view of the rotating structure having bar assembly with bipod supports according to one embodiment of the invention.

The bar support 530 may be attached to the outer surface of the inner ring 220 and coupled to the core circular bar 510. The rollers 240 are placed beneath the bar supports 530 from the first surface 275. The motors 250 are engaged to the core circular bar 510 from the first surface 275 of the trench 270 as in the previous embodiments.

Figure 6:
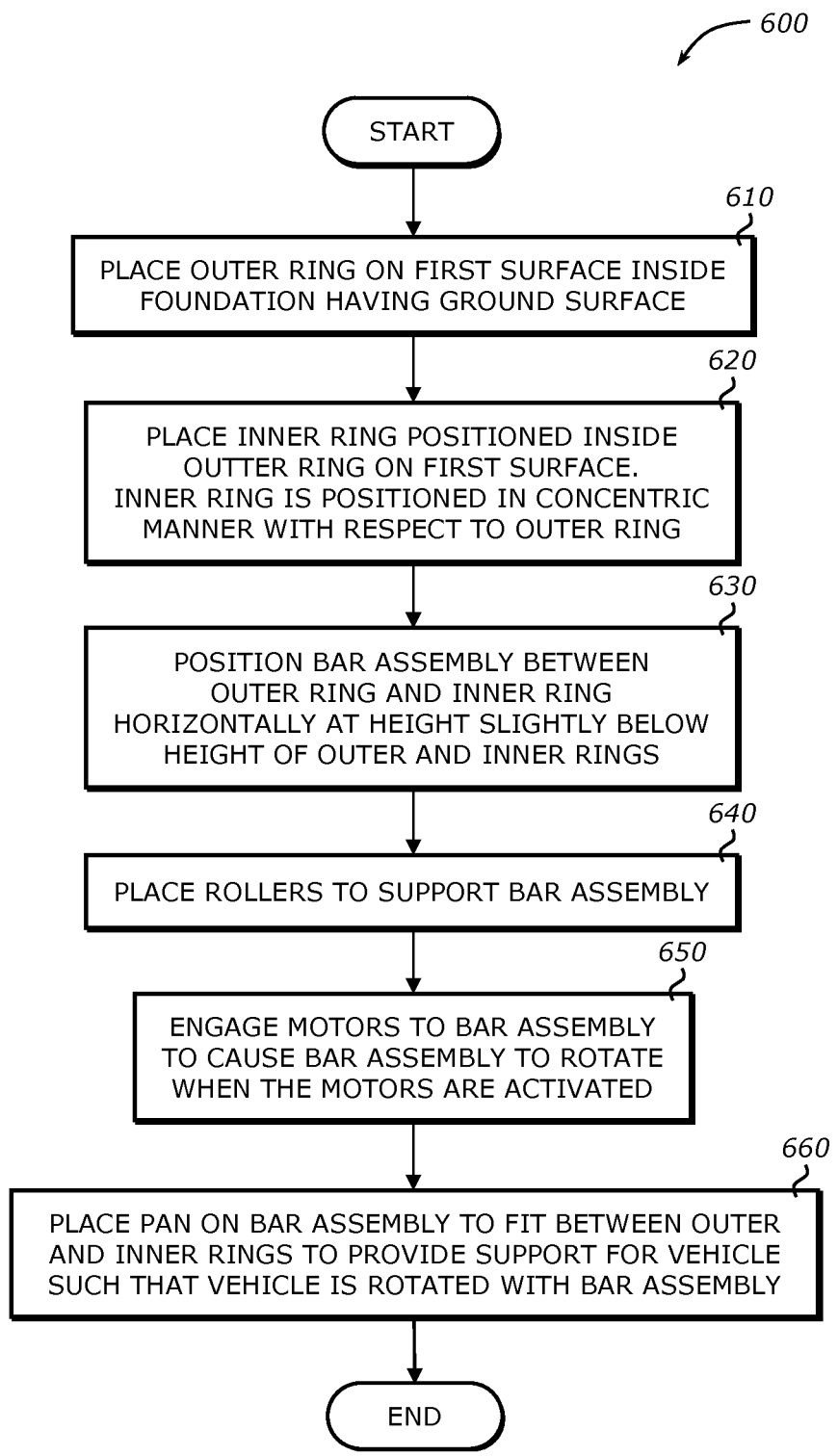
FIG. 6 is a flowchart illustrating a process to construct a rotating structure according to one embodiment of the invention.

FIG. 6 is a flowchart illustrating a process 600 to construct a rotating structure according to one embodiment of the invention.

Upon START, the process 600 places an outer ring on a first surface inside a foundation having a ground surface (Block 610). The first surface is the bottom surface of a trench in the foundation. Then, the process 600 places an inner ring positioned inside the outer ring on the first surface (Block 620). The inner ring is positioned in a concentric manner with respect to the outer ring. Next, the process 600 positions a bar assembly between the outer ring and the inner ring (Block 630). The bar assembly is positioned horizontally at a height slightly below the height of the outer and inner rings.

Then, the process 600 places a plurality of rollers to support the bar assembly (Block 640). Next, the process 600 engages a plurality of motors to the bar assembly to cause the bar assembly to rotate when the motors are activated (Block 650). Then, the process 600 places a pan on the bar assembly to fit between the outer and inner rings to provide support for a vehicle such that the vehicle is rotated with the bar assembly (Block 660). The pan has an annular shape that fits the space between the outer ring and the inner ring and is flush with the ground surface. The process 600 is then terminated.

Figure 7:
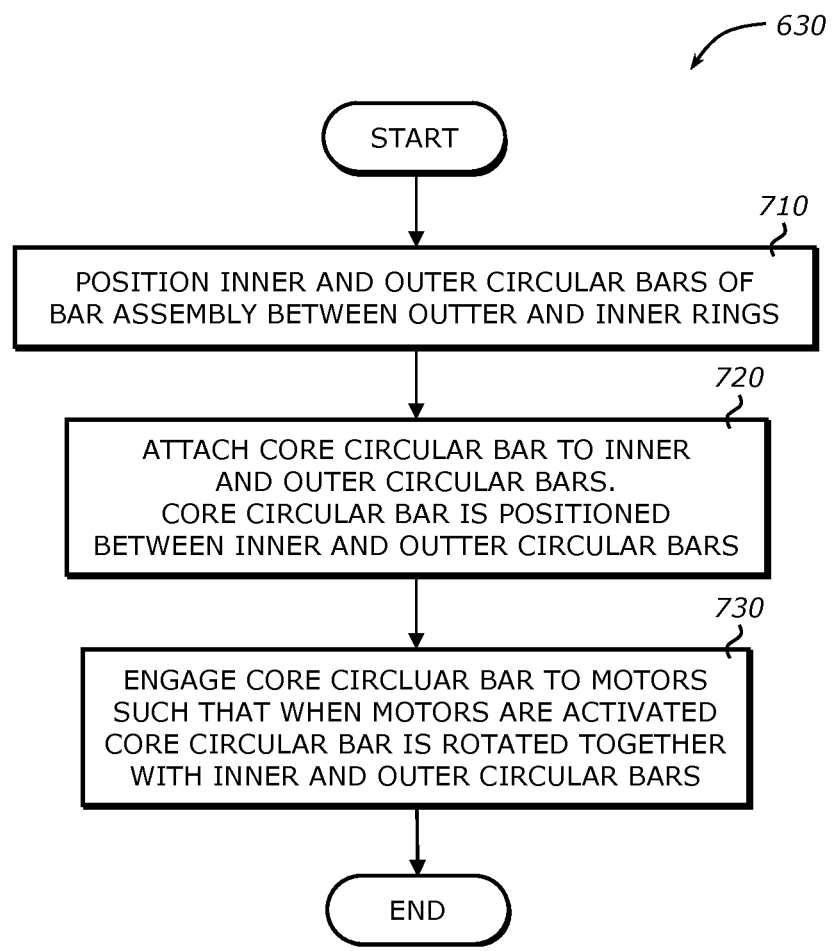
FIG. 7 is a flowchart illustrating a process to position the bar assembly according to one embodiment of the invention.

FIG. 7 is a flowchart illustrating the process 630 to position the bar assembly according to one embodiment of the invention.

Upon START, the process 630 positions inner and outer circular bars of the bar assembly between the outer and inner rings (Block 710). Next, the process 630 attaches a core circular bar to the inner and outer circular bars (Block 720). This may be performed by using attachment bars that are secured or coupled to all the three bars at approximately equal distances around the circular bars. The core circular bar is positioned between the inner and outer circular bars. Then, the process 630 engages the core circular bar to the plurality of motors such that when the motors are activated the core circular bar is rotated together with the inner and outer circular bars (Block 730). The process 630 is then terminated.

Figure 8A:
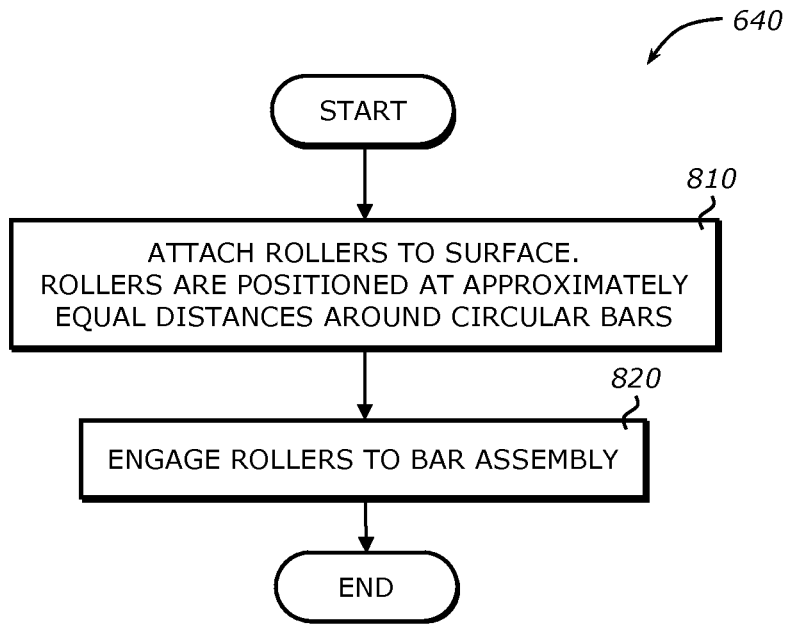
FIG. 8A is a flowchart illustrating a process to place the rollers from the first surface according to one embodiment of the invention.

FIG. 8A is a flowchart illustrating the process 640 to place the rollers from the first surface according to one embodiment of the invention. This process corresponds to the first embodiment as shown in FIGS. 3A and 3B.

Upon START, the process 640 attaches the rollers to the first surface (Block 810). The rollers are positioned at approximately equal distances around the circular bars. Next, the process 640 engage the rollers to the bar assembly (Block 820). The process 640 is then terminated.

Figure 8B:
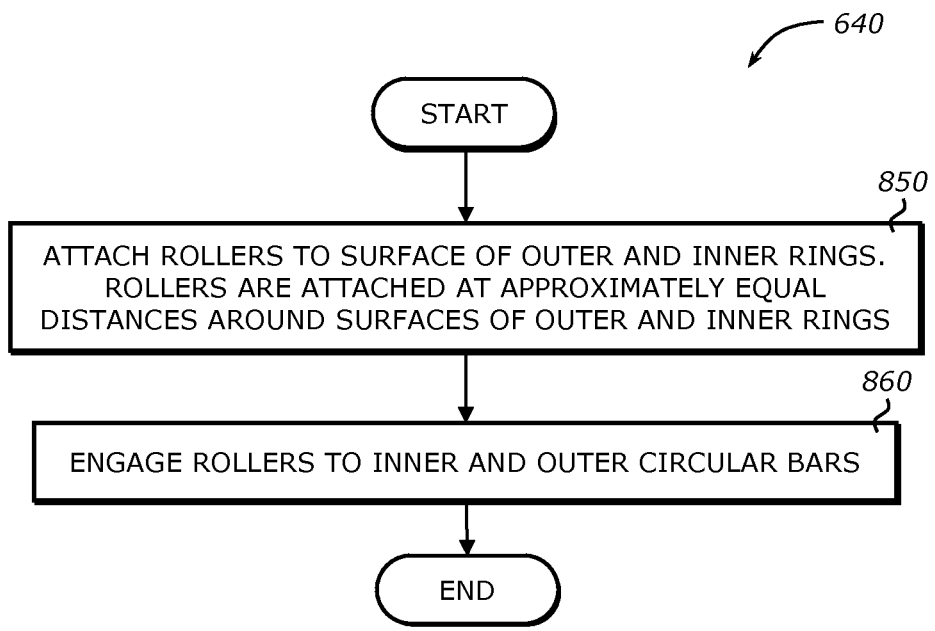
FIG. 8B is a flowchart illustrating a process to place the rollers laterally according to one embodiment of the invention.

FIG. 8B is a flowchart illustrating the process 640 to place the rollers laterally according to one embodiment of the invention. This process corresponds to the second embodiment as shown in FIGS. 4A and 4B.

Upon START, the process 640 attaches the rollers to surfaces of outer and inner rings (Block 850). This may be performed by attaching inner rollers to outer surface of the inner ring and outer rollers to inner surface of the outer ring. The rollers are attached at approximately equal distances around surfaces of the outer and inner rings. Next, the process 640 engages the rollers to the inner and outer circular bars (Block 860). The process 640 is then terminated.

Figure 9:
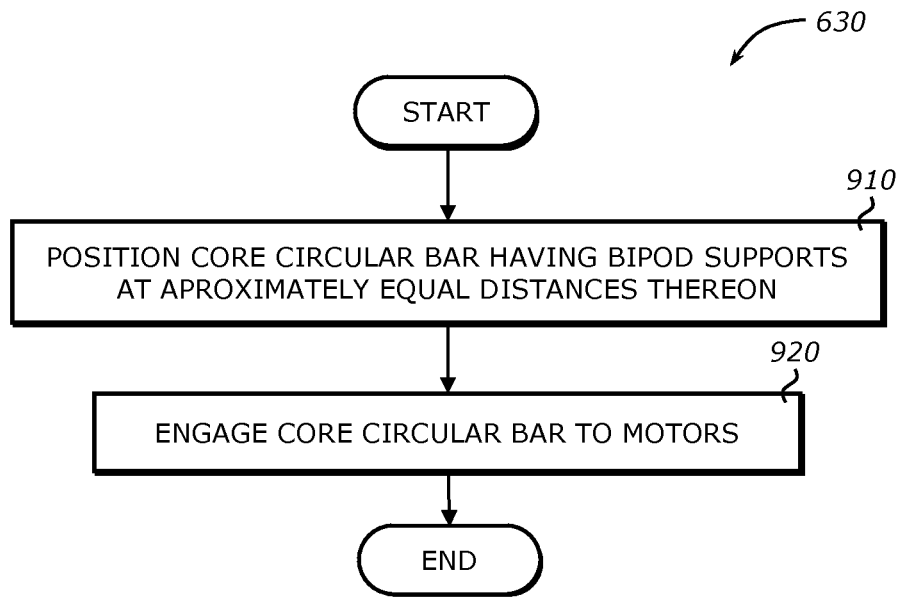
FIG. 9 is a flowchart illustrating a process to position the bar assembly with bipod supports according to one embodiment of the invention.

FIG. 9 is a flowchart illustrating the process 630 to position the bar assembly with bipod supports according to one embodiment of the invention. This process corresponds to the third embodiment as shown in FIGS. 5A and 5B.

Upon START, the process 630 positions a core circular bar having a plurality of bipod supports at approximately equal distances thereon (Block 910). Next, the process 630 engages the core circular bar to the plurality of motors (Block 920). The process 630 is then terminated.

Figure 10:
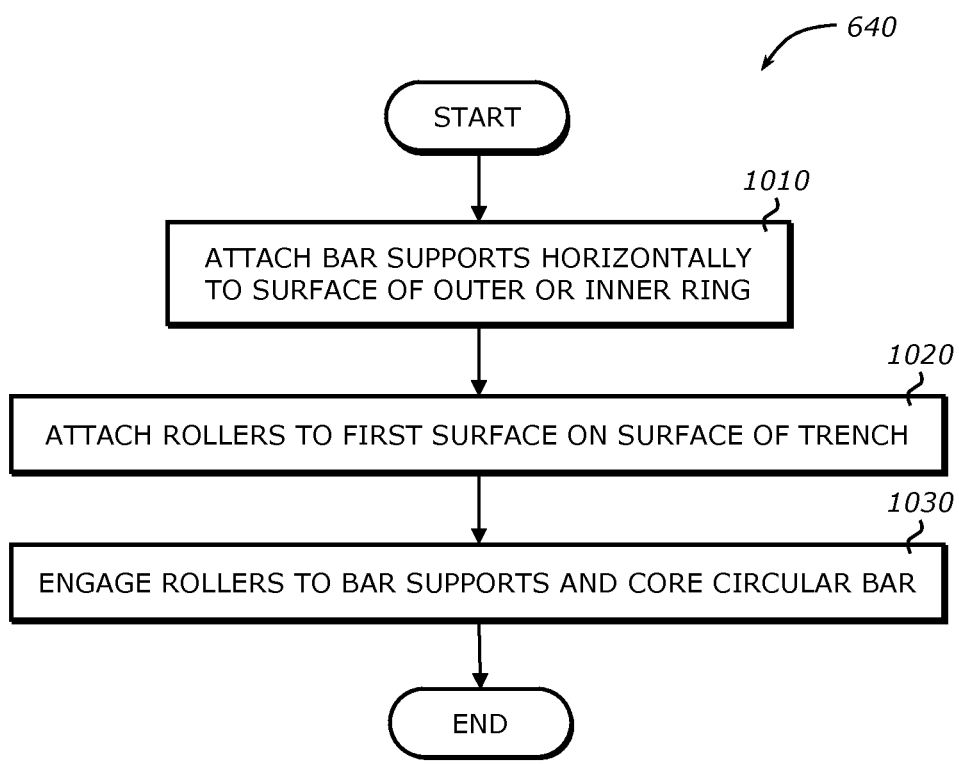
FIG. 10 is a flowchart illustrating a process to place the rollers to support the bar assembly with bipod supports according to one embodiment of the invention.

FIG. 10 is a flowchart illustrating the process 640 to place the rollers to support the bar assembly with bipod supports according to one embodiment of the invention. This process corresponds to the third embodiment as shown in FIGS. 5A and 5B.

Upon START, the process 640 attaches a plurality of bar supports horizontally to surface of the outer or inner ring (Block 1010). Next, the process 640 attaches the rollers to the first surface on surface of the trench (Block 1020). Then, the process 640 engages the rollers to the plurality of bar supports and the core circular bar (Block 1030). The process 640 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
an outer ring placed on a first surface of a trench in a foundation having a ground surface;
an inner ring positioned inside the outer ring on the first surface;
a bar assembly positioned between the outer ring and the inner ring;
a plurality of rollers to support the bar assembly; and
a plurality of motors engaging the bar assembly to cause the assembly to rotate when activated;
wherein the bar assembly comprises:
a core circular bar having a plurality of bipod supports positioned at approximately equal distances thereon, the core circular bar being engaged to the plurality of motors.

* * * * *